United States Patent
Smith et al.

(10) Patent No.: US 6,732,215 B2
(45) Date of Patent: May 4, 2004

(54) SUPER SCALABLE MULTIPROCESSOR COMPUTER SYSTEM

(75) Inventors: Mitchell Smith, Camarillo, CA (US); Karsten Jeppesen, Camarillo, CA (US)

(73) Assignee: Total Impact, Camarillo, CA (US)

( * ) Notice: Subject to any disclaimer, the term of this patent is extended or adjusted under 35 U.S.C. 154(b) by 481 days.

(21) Appl. No.: 09/727,250

(22) Filed: Feb. 5, 2001

(65) Prior Publication Data

US 2004/0024942 A1 Feb. 5, 2004

(51) Int. Cl.[7] ............................................. G06F 15/16
(52) U.S. Cl. ..................... 710/305; 710/100; 709/208; 370/901
(58) Field of Search ................................ 710/100, 305; 712/11, 16, 17, 32, 34, 36; 709/253, 200, 208, 223, 102; 370/401, 901, 908; 700/3, 9, 4; 706/10

(56) References Cited

U.S. PATENT DOCUMENTS 5,613,070 A * 3/1997 Born
6,101,419 A * 8/2000 Kennedy et al.
6,460,128 B1 * 10/2002 Baxter et al.

* cited by examiner

Primary Examiner—Gopal C. Ray
(74) Attorney, Agent, or Firm—Frank Frisenda, Jr.

(57) ABSTRACT

An expandable multiprocessor computer system is provided incorporating a master computer, control computers and servant computers housed in modular units. Servant computers of the super scalable multiprocessor system act as cells of a singular entity enhancing system performance over conventional individually networked computers. Application information is transported between servant computers by way of a standard ultra high speed primary network as opposed to a specialized ultra high speed back plane. The design of the primary network allows for parallel internal data transfer in single modules, and allows for parallel internal data transfer between multiple modules through the provision of control computers in each module. Administration information is transported between the master computer, control computers and servant computers by way of a secondary network.

1 Claim, 6 Drawing Sheets

The dashed line shows that a packet from a briq in one raq to a briq in another raq must pass two routers

SUPER SCALABLE MULTIPROCESSOR COMPUTER SYSTEM

BACKGROUND OF THE INVENTION

The present invention relates to parallel data processing systems, and more particularly to, a unique expandable multiprocessor computer system incorporating a master computer, control computers and servant computers housed in modular units.

The advent and progression of the information age has caused a proliferation of data. Currently, many medium to large companies require document annotation, markup, workflow projections, configuration management, text retrieval, optical character retrieval, form handling, and other procedures. The hugh amount of data compiled and the management of it has resulted in two significant problems in this sector. Namely, insufficient processing capabilities and, as evident in the communications sector, a limitation on the amount of bandwidth available to move the data swiftly.

Space is a premium in corporate and ISP data centers. Compute density of board level products is therefore a key consideration when small-footprint, standard-form-factor systems are required to maximize available cabinet space. Accordingly, there has been an increasing demand for data processing systems incorporating "scalable architecture". As this term implies, the system can grow as the need for more data processing grows. Corporations and ISP's can dynamically link up additional TI Thin Servers in a single cluster to handle enormous volumes of network transactions. Automated, pre-installed load balancing and management applications enable clusters to perform efficiently with minimum down time.

High performance computing (HPC) is a technical term describing the method in which significant computational power accesses or processes very large amounts of data very quickly, or a computing characteristic where there is a need to operate interactively across a geographically distributed network. HPC is manifested in such task s as optimization of industrial processes, computational modeling, on-line transaction processing, data mining and decision support, and complex visualization and virtual reality.

Until recently, HPC was dominated by large, specialized supercomputers.

Traditional markets for HPC systems are aerospace, automotive, chemical, pharmaceutical, environmental, government, petroleum, and a wide range of others involving electromagnetics, chemistry, fluid dynamics, weather prediction and 3D seismic processing. Easily recognizable users within these markets are universities such as UCLA and Purdue, government research labs such as Los Alamos, Lawrence Livermore and White Sands, and private companies such as Hughes, Lockheed Martin, Boeing, and Arco.

As the demand continues for high performance computing (HPC) those skilled in the art have recognized a significant need for a thin server solution designed to accommodate very large network applications. The present invention fulfills this need.

SUMMARY OF THE INVENTION

An expandable multiprocessor computer system is provided incorporating a master computer, control computers and servant computers housed in modular units. Servant computers of the super scalable multiprocessor system act as cells of a singular entity enhancing system performance over conventional individually networked computers. Application information is transported between servant computers by way of a standard ultra high speed primary network as opposed to a specialized ultra high speed back plane. The design of the primary network allows for parallel internal data transfer in single modules, and allows for parallel internal data transfer between multiple modules through the provision of control computers in each module. Administration information is transported between the master computer, control computers and servant computers by way of a secondary network.

In a presently preferred embodiment, the inventive modular parallel processing system comprises, in combination:

a) a master computer;

b) a plurality of control computers each having means to route information between system modules;

c) a plurality of single board servant computers each having means to execute processing in accordance with a start instruction to retrieve identification information and to load a prescribed operating system;

d) primary network means for transporting application information between the servant computers by standard ultra high speed network, the primary network means being capable of parallel internal data transfer within single modules and parallel internal data transfer between multiple modules and e) secondary network means for transporting administrative information between the master computer, control computers and servant computers to control the distribution of IP addresses when the system is initiated to facilitate identification of servant computers and to enable remote booting of such servant computers.

In accordance with the present invention, a unique expandable multiprocessor system is provided which enables ISPs to cost-efficiently host typical end-user services—such as Web sites, email, calendaring and scheduling—and scale those services quickly and easily to meet surges in demand. The novel system also provides an opportunity for ISPs to take advantage of business application outsourcing. For example, Enterprise Resource Planning (ERP), sales force automation, and call center applications are typically extremely large and complex, and are not easily condensed or simplified for customers who do not require the full functionality of the application. ISPs can use the inventive systems to host these applications and offer functionality as needed to their customers. This strategy enables smaller companies to take advantage of enterprise-class applications and services.

DESCRIPTION OF THE PREFERRED EMBODIMENTS

Figure 1:
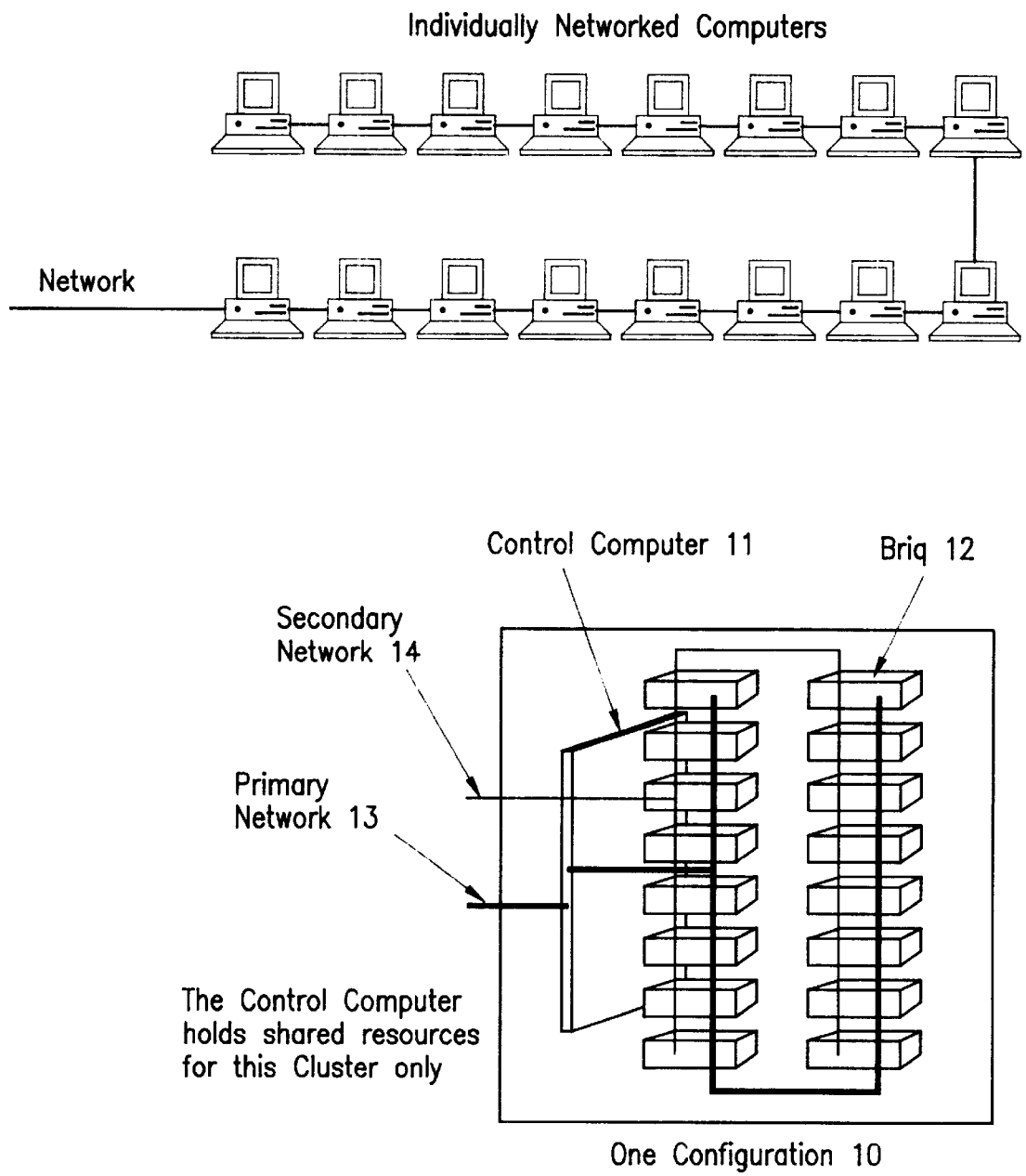
FIG. 1 is a schematic illustration of a control computer and a plurality of servant computers of a system module in accordance with the one embodiment of the present invention.
Figure 2:
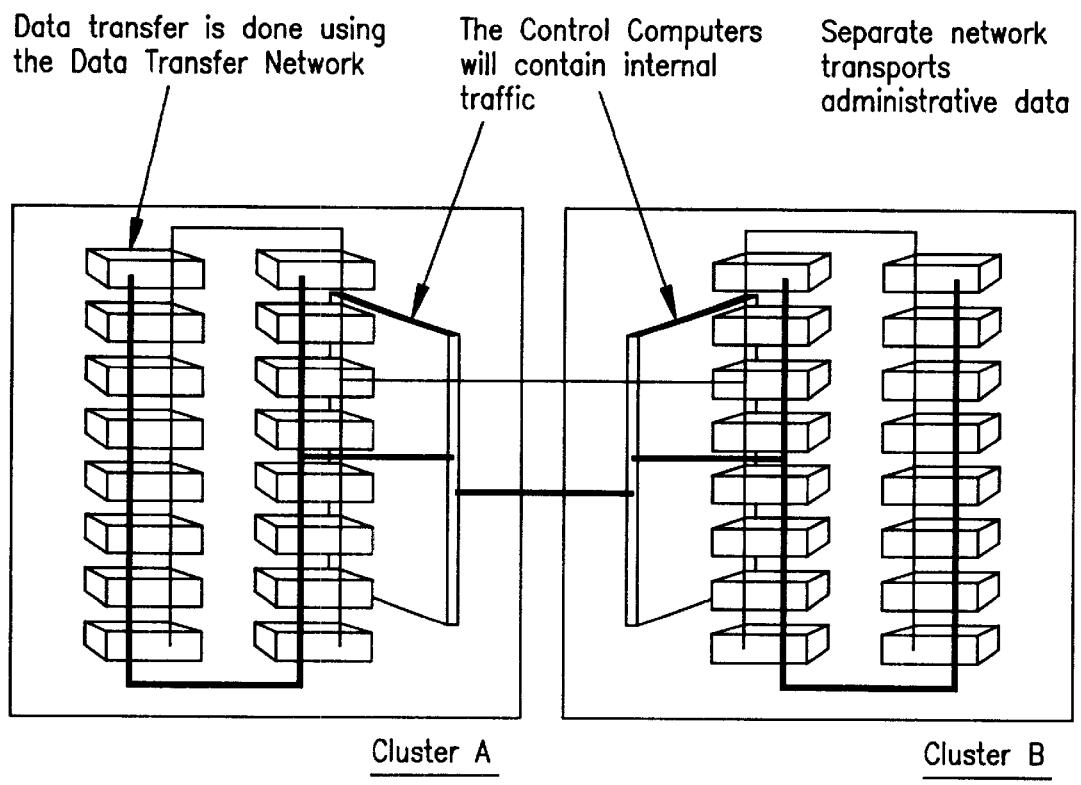
FIG. 2 is a schematic illustration of two system modules further illustrating a primary network for transporting data transfer between servant computers within a module and parallel internal data transfer between two modules in accordance with one embodiment of the present invention.
Figure 3:
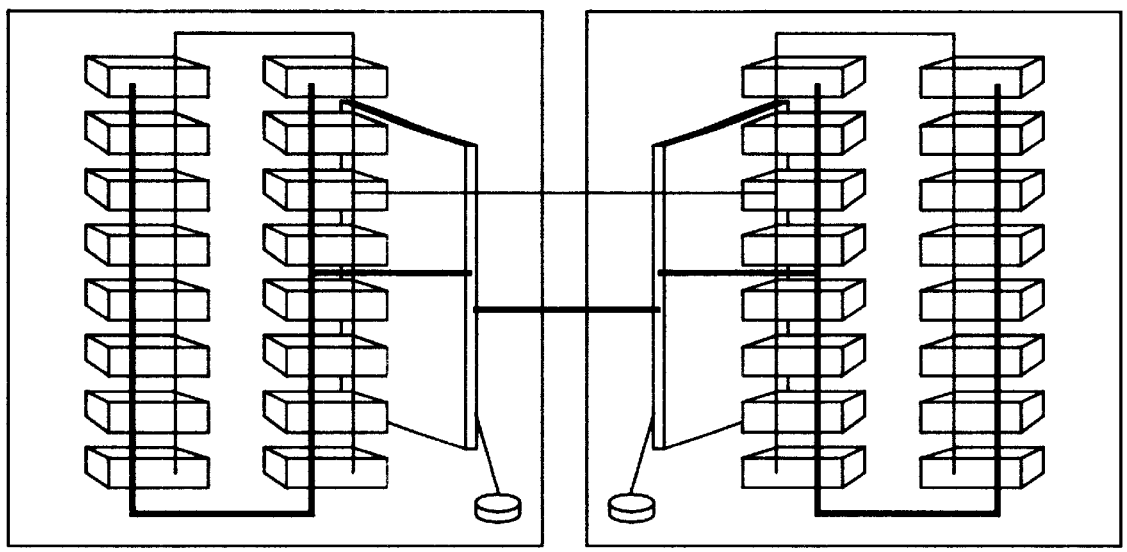
FIG. 3 is a schematic illustration of two system modules further illustrating standard hardware abstracted mounting techniques in accordance with one embodiment of the present invention.
Figure 4:
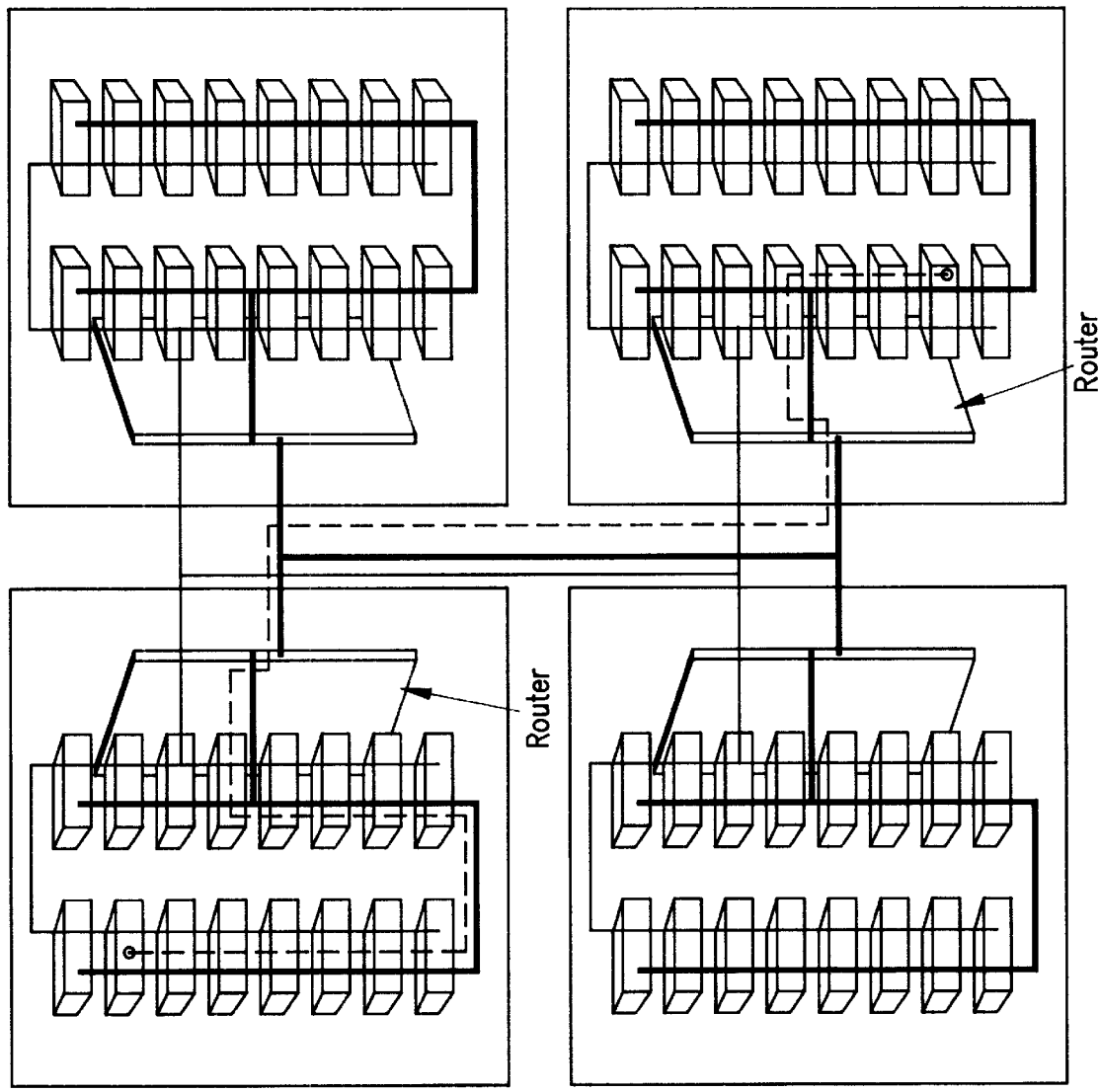
FIG. 4 is a schematic illustration of four system modules further illustrating a servant computer in one rack to a servant computer in another rack with routers in accordance with one embodiment of the present invention.
Figure 5:
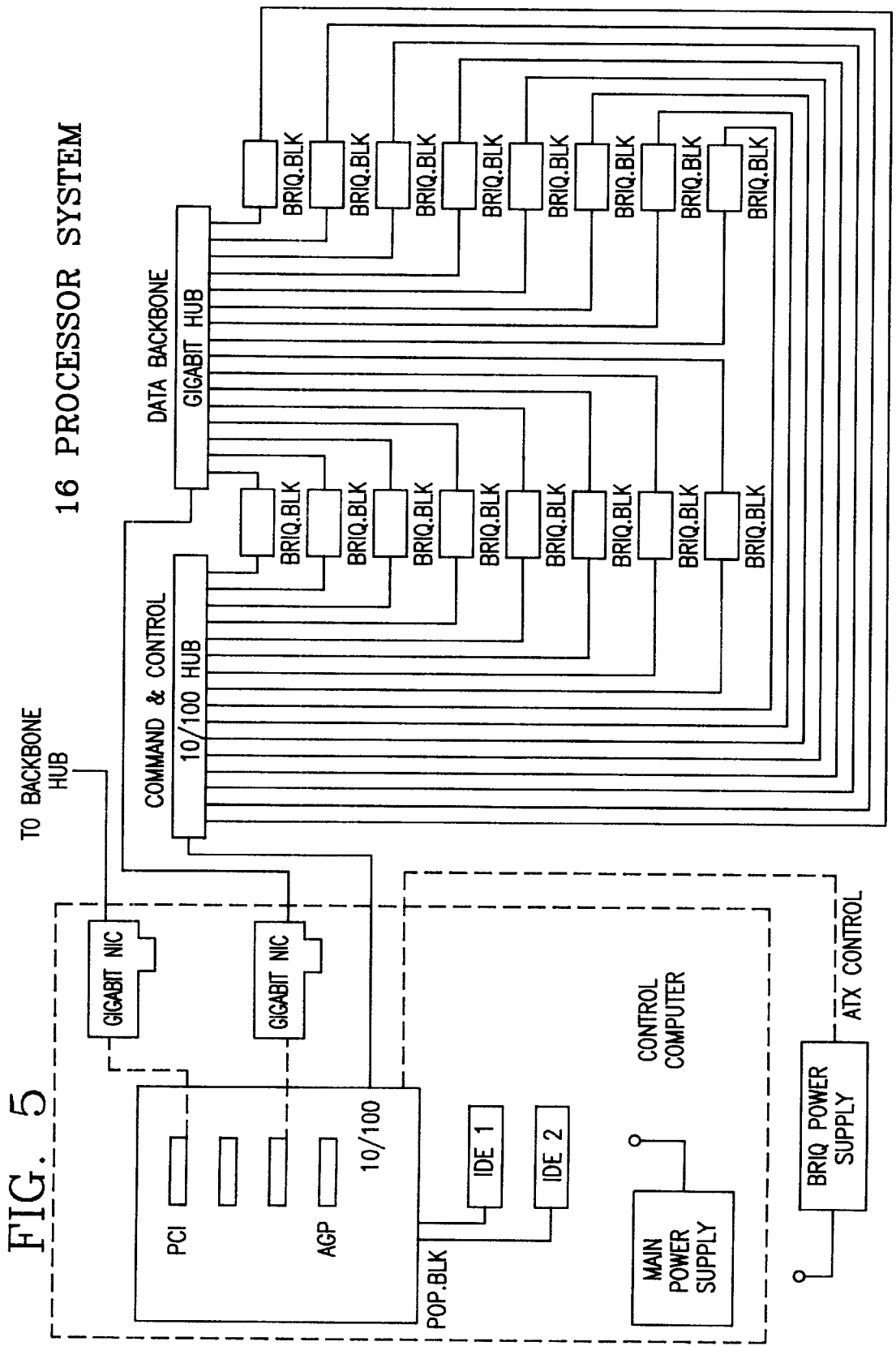
FIG. 5 is a block diagram depicting a system module comprising a sixteen servant computers, and a control computer in accordance with one embodiment of the present invention.
Figure 6:
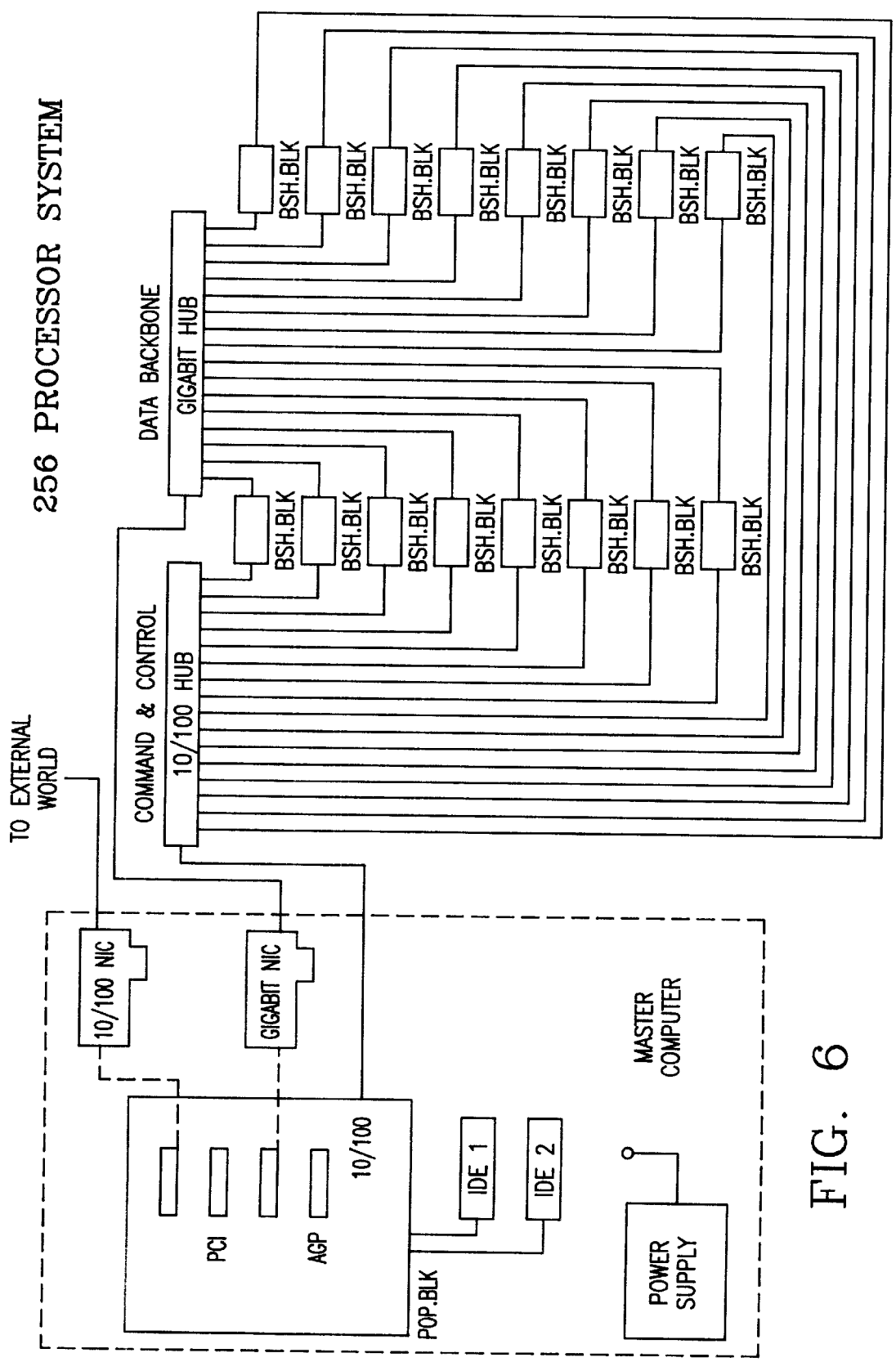
FIG. 6 is a block diagram depicting a 256 processor system using five equipment racks in relationship to a master computer in accordance with one embodiment of the present invention.

An expandable multiprocessor computer system is provided incorporating a master computer, control computers and servant computers housed in modular units. Servant computers of the super scalable multiprocessor system act as cells of a singular entity enhancing system performance over conventional individually networked computers. Application information is transported between servant computers by way of a standard ultra high speed primary network as opposed to a specialized ultra high speed back plane. The design of the primary network allows for parallel internal data transfer in single modules, and allows for parallel internal data transfer between multiple modules through the provision of control computers in each module. Administration information is transported between the master computer, control computers and servant computers by way of a secondary network.

In a presently preferred embodiment, the inventive modular parallel processing system comprises, in combination:

a) a master computer;

b) a plurality of control computers each having means to route information between system modules;

c) a plurality of single board servant computers each having means to execute processing in accordance with a start instruction to retrieve identification information and to load a prescribed operating system;

d) primary network means for transporting application information between the servant computers by standard ultra high speed network, the primary network means being capable of parallel internal data transfer within single modules and parallel internal data transfer between multiple modules and e) secondary network means for transporting administrative information between the master computer, control computers and servant computers to control the distribution of IP addresses when the system is initiated to facilitate identification of servant computers and to enable remote booting of such servant computers.

Upon startup each servant computer uses the bootup or an equivalent protocol to retrieve its ID and to load its operating systems which has been migrated to the nearest control computer by the master computer. The master computer maintains full control over IP addresses, box and brick position data, and root load point.

When started the following daemons are activated:

1) System migration daemon. This daemon is active on the control computer only, enabling update of the system on the control computer to match current kernel.

2) Application daemon. This daemon is active on the servant computer only, to manages application migration so that activation is totally transparent to the user.

3) Standard output; Standard error output daemon. Collects data from control computers and servant computers and sends collected data to the master computer for user debugging purposes.

Accordingly, operation can be confirmed visually on the front panels of the servant computers or by activating an html web interface. Once a user has transferred the user's program and control to the master computer, the master computer copies the application to each of the servant computers for execution, hence the user views the master computer as being the entire system.

The novel concept of two separate networks keeps network load at an absolute minimum. The primary network is strictly reserved for fast interprocess communication. Routers are required to allow two processors in the same box to communicate in parallel with two processors communicating in another box. The secondary network takes care of all non-critical transport. It is thus used for IP address discovery, boot information, web traffic, debug information and whatever is not strictly inter process communication.

Much of the computing world is moving from single processor configurations to parallel processor configurations. One example of a parallel processor configuration 10 is shown in FIG. 1. As illustrated, the configuration 10 includes a plurality of asynchronously executing servant computers 12 in communication with one another via the communication networks 13 and 14. Each servant computer generally includes at least a CPU, memory and two network interfaces. In performing "parallel processing", the software will make use of the collective resources of the configuration 10 in accordance with the instructions of the software. The resource requirements may or may not be equally shared by the servant computers but is strictly governed by the instructions of the software. Additionally, any task executed by the servant computers may require the servant computers and the control computers and the master computer to share information or other resources via the networks 13 and 14. The determination of which network to use is left to the software and is thus not part of the hardware involved.

Parallel multi-processor networks may be embodied in a variety of other configurations. For example, FIGS. 2 through 6 illustrate a variety of embodied configurations.

The general goal of parallel multi-processor networks is to require less processing time than a single processor or non-parallel processors. Adding more processors to a parallel multi-processor network adds computing power, which, in theory, should reduce the overall execution time for completing tasks. However, for computations that require the processors to share information, the time spent on distributing shared information to the processors can reduce, and in many cases cancel, whatever time savings may have been achieved by adding processors to the network.

In contrast to conventional systems, the present invention does not use a cluster controller in the sense of a master with subordinate slave units (closely coupled), but in the sense of a taxi dispatcher (loosely coupled). The system will use software to control the synchronization (loosely coupled) and commercially available chips that do not require complex register based dispatch mechanisms.

In accordance with the present invention, each cluster is on its own subnetted network. Therefore, a node wanting to talk to another node not present in its own cluster will have to go through two routers.

In accordance with the present invention, a unique expandable multiprocessor system is provided which enables ISPs to cost-efficiently host typical end-user services—such as Web sites, email, calendaring and scheduling—and scale those services quickly and easily to meet surges in demand. The novel system also provides an opportunity for ISPs to take advantage of business application outsourcing. For example, Enterprise Resource Planning (ERP), sales force automation, and call center applications are typically extremely large and complex, and are not easily condensed or simplified for customers who do not require the full functionality of the application. ISPs can use the inventive systems to host these applications and offer functionality as needed to their customers. This strategy enables smaller companies to take advantage of enterprise-class applications and services.

We claim:

1. An expandable modular multiprocessor computer system, comprising in combination:

a) a master computer;

b) a plurality of control computers each having means to route information between system modules;

c) a plurality of single board servant computers each having means to execute processing in accordance with a start instruction to retrieve identification information and to load a prescribed operating system;

d) primary network means for transporting application information between the servant computers by standard ultra high speed network, the primary network means being capable of parallel internal data transfer within single modules and parallel internal data transfer between multiple modules; and e) secondary network means for transporting administrative information between the master computer, control computers and servant computers to control the distribution of IP addresses when the system is initiated to facilitate identification of servant computers and to enable remote booting of such servant computers.

* * * * *